US010754610B2

(12) United States Patent
Hayasaka

(10) Patent No.: US 10,754,610 B2
(45) Date of Patent: Aug. 25, 2020

(54) TARGET POSITION SETTING APPARATUS AND SOUND IMAGE LOCALIZATION APPARATUS

(71) Applicant: TEAC CORPORATION, Tokyo (JP)

(72) Inventor: Kaname Hayasaka, Tokyo (JP)

(73) Assignee: TEAC CORPORATION, Tokyo (JP)

(*) Notice: Subject to any disclaimer, the term of this patent is extended or adjusted under 35 U.S.C. 154(b) by 68 days.

(21) Appl. No.: 15/899,975

(22) Filed: Feb. 20, 2018

(65) Prior Publication Data
US 2018/0314488 A1 Nov. 1, 2018

(30) Foreign Application Priority Data

Apr. 27, 2017 (JP) .................................. 2017-088857

(51) Int. Cl.
| | |
|---|---|
| *G06F 3/16* | (2006.01) |
| *H04S 7/00* | (2006.01) |
| *G06F 3/0484* | (2013.01) |
| *G06F 3/0488* | (2013.01) |
| *H04S 3/00* | (2006.01) |

(52) U.S. Cl.
CPC .......... *G06F 3/165* (2013.01); *G06F 3/04845* (2013.01); *G06F 3/04847* (2013.01); *G06F 3/04883* (2013.01); *H04S 7/30* (2013.01); *H04S 7/303* (2013.01); *H04S 3/008* (2013.01); *H04S 2400/11* (2013.01); *H04S 2420/01* (2013.01)

(58) Field of Classification Search
CPC .. G06F 3/165; G06F 3/04845; G06F 3/04883; G06F 3/04887; H04S 3/008; H04S 7/303
See application file for complete search history.

(56) References Cited

U.S. PATENT DOCUMENTS

| | | | | |
|---|---|---|---|---|
| 5,440,639 A | * | 8/1995 | Suzuki .................... | H04S 1/002 381/17 |
| 5,521,981 A | * | 5/1996 | Gehring .................. | H04S 1/002 381/17 |
| 8,190,438 B1 | * | 5/2012 | Nelissen ................. | G10L 21/00 381/85 |
| 2002/0150257 A1 | * | 10/2002 | Wilcock ............... | G11B 19/025 381/17 |
| 2008/0219454 A1 | | 9/2008 | Iida et al. | |

(Continued)

FOREIGN PATENT DOCUMENTS

| | | |
|---|---|---|
| CN | 101065990 A | 10/2007 |
| CN | 101175343 A | 5/2008 |

(Continued)

*Primary Examiner* — Eric J. Bycer
(74) *Attorney, Agent, or Firm* — Seed IP Law Group LLP

(57) ABSTRACT

Disclosed is an apparatus for setting a target position using a GUI screen. The apparatus includes a display that displays a representation of a listener and a representation of a hemispherical dome with the listener at the center as projected on a horizontal plane. A user sets a radius of the hemispherical dome through a click operation of a mouse and sets a target position of a sound image with respect to the listener through a drag operation toward the center. The sound image position is represented by a dot O. The dot O represents a position of the sound image with respect to the listener in the left-to-right direction, in the front-to-rear direction, and in the height direction.

16 Claims, 6 Drawing Sheets

(56) References Cited

U.S. PATENT DOCUMENTS

| | | |
|---|---|---|
| 2009/0034772 A1 | 2/2009 | Iida et al. |
| 2010/0080396 A1* | 4/2010 | Aoyagi .................. H04S 1/005 |
| | | 381/17 |
| 2012/0057715 A1* | 3/2012 | Johnston ............... G10L 19/008 |
| | | 381/63 |
| 2012/0210223 A1* | 8/2012 | Eppolito .................. H04S 7/40 |
| | | 715/716 |
| 2015/0023524 A1 | 1/2015 | Shigenaga et al. |
| 2015/0326988 A1* | 11/2015 | Zielinsky ................ G06F 3/165 |
| | | 381/307 |
| 2016/0227342 A1* | 8/2016 | Yuyama .................... H04S 7/30 |
| 2017/0215018 A1* | 7/2017 | Rosset .................... H04S 5/005 |
| 2018/0139565 A1* | 5/2018 | Norris .................... H04S 1/007 |

FOREIGN PATENT DOCUMENTS

| | | |
|---|---|---|
| CN | 104301664 A | 1/2015 |
| JP | 2004-193877 A | 7/2004 |
| JP | 2008-211834 A | 9/2008 |

\* cited by examiner

TARGET POSITION SETTING APPARATUS AND SOUND IMAGE LOCALIZATION APPARATUS

CROSS REFERENCE TO RELATED APPLICATION

The disclosure of Japanese Patent Application No. 2017-088857 filed on Apr. 27, 2017 including the specification, claims, drawings, and abstract is incorporated herein by reference in its entirety.

TECHNICAL FIELD

The present disclosure relates to a target position setting apparatus and a sound image localization apparatus.

BACKGROUND

There have been proposed sound image localization apparatuses for processing a sound source signal to localize a sound image at a target position.

JP 2004-193877 A discloses a structure for setting a sound image position, the structure including an X position setting section for setting a longitudinal position on a horizontal plane, a Y position setting section for setting a lateral position on the horizontal plane, a Z position setting section for setting a height position on a vertical plane, a θ position setting section for setting an angle of the horizontal plane, and a φ position setting section for setting an angle of the vertical plane. The listener can set the positions by clicking each item of these setting sections displayed on a graphical user interface (GUI) application screen and sliding a slider.

JP 2008-211834 A discloses a sound image localization apparatus in which a head-related transfer function is implemented.

Jens Blauert, Masayuki Morimoto, and Toshiyuki Goto, "Spatial Hearing", Kajima Institute Publishing Co., Ltd., Jul. 10, 1986, discloses a technique for localizing a sound image at a desired position by reproducing a head-related transfer function and convolving it with a sound source signal to present the resultant position to the listener.

However, the above-described approach that involves the operation of the X position setting section, the Y position setting section, the Z position setting section, the θ position setting section, and the φ position setting section has a drawback in that it is difficult to image a 3D position of an actual stereoscopic sound image.

As an alternative, there also has been developed binaural recording in which sound is collected using a high-sensitivity microphone attached to a model of a human head at a position behind the eardrum, "a dummy head microphone"; however, this method is generally costly.

SUMMARY

The present disclosure provides a technique that allows easy setting of a target position by using a GUI screen.

According to an aspect of the present disclosure, there is provided a target position setting apparatus comprising a display configured to display a first representation that represents a listener, a second representation that is obtained by projecting a hemispherical dome having a radius R with the listener at the center on a horizontal plane, and a mark that represents a target position in association with the second representation; a first operation element configured to set the radius R; a second operation element configured to freely move the mark within the second representation; and a controller configured to output three-dimensional position data of the mark with respect to the listener as target position data for sound image localization.

In one embodiment of the present disclosure, the display is further configured to display a third representation that is obtained by projecting the hemispherical dome having the radius R on a vertical plane and to display the mark in association with the third representation.

In another embodiment of the present disclosure, the second representation has a size that represents a distance from a sound image with respect to the listener, and the mark is located at a position that represents a position of the sound image with respect to the listener in a left-to-right direction, in a front-to-rear direction, and in a height direction.

In still another embodiment of the present disclosure, the first operation element and the second operation element comprise a mouse, the radius R is set in response to a click operation of the mouse, and the mark is moved in response to a drag operation of the mouse.

In still another embodiment of the present disclosure, the first operation element and the second operation element comprise a touch screen, the radius R is set in response to a touch operation on the touch screen, and the mark is moved in response to movement of a finger on the touch screen.

In still another embodiment of the present disclosure, each of the first operation element and the second operation element comprises a slide bar displayed on the display.

According to another aspect of the present disclosure, there is provided a sound image localization apparatus comprising the above-described target position setting apparatus; and a sound source signal processing apparatus configured to process a sound source signal using the target position data output from the target position setting apparatus to output a sound image localization signal.

The present disclosure allows easy setting of a target position for sound image localization using a GUI screen. Particularly, the present disclosure allows a user to easily identify a three-dimensional position of a sound image with respect to a listener.

BRIEF DESCRIPTION OF DRAWINGS

Embodiments of the present disclosure will be described by reference to the following figures, wherein.

DESCRIPTION OF EMBODIMENTS

Embodiments of the present disclosure will be described below with reference to the accompanying drawings.

GUI Screen as Precondition

A GUI screen that serves as a precondition in the illustrated embodiments will be described below.

Figure 1:
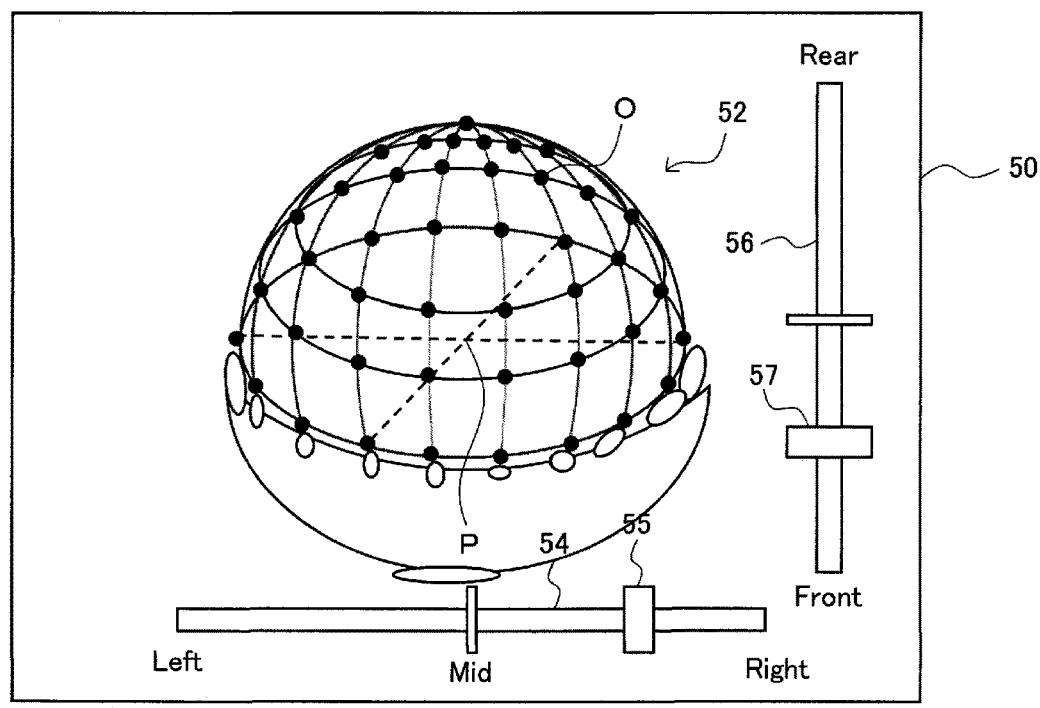
FIG. 1 illustrates a GUI screen that serves as a precondition for embodiments.

FIG. 1 illustrates a GUI screen displayed on a display 50 of a target position setting apparatus for setting a target position of a sound image that serves as a precondition for sound image localization. The GUI screen includes a hemispherical dome 52 and two slide bars 54 and 56.

A listener is located at the midpoint P of the hemispherical dome 52, and a sound image is localized at a desired position on the surface of the dome 52.

The slide bar 54 is a slide bar for localizing a position in the left-to-right direction with respect to the listener, and a sound image is moved in the left-to-right direction by moving a slider 55 using, for example, a mouse. The slide bar 54 corresponds to a slide bar for changing an azimuth angle θ in a horizontal plane. The slide bar 56 is a slide bar for localizing a position in the front-to-rear direction with respect to the listener, and a sound image is moved in the front-to-rear direction by moving a slider 57 using, for example, a mouse. The slide bar 56 corresponds to a slide bar for changing an angle (elevation angle) φ of a vertical plane. The target position of a sound image on the surface of the hemispherical dome 52 is represented by, for example, a dot O, and the sound image target position with respect to the listener can be easily imaged by moving the dot O as the slider 55 or 57 is moved.

It is, however, difficult to identify the X position, the Y position, and the Z position of a sound image, as such a GUI basically allows localization by setting the azimuth angle θ and the elevation angle φ. Specifically, to set a movement path of a sound image that successively moves, for example, from near the right ear of the listener passing around behind the listener to near the left ear of the listener, while it appears that this can be easily achieved by identifying the X position, the Y position, and the Z position, it is difficult to identify them only with the hemispherical dome 52.

In the illustrated embodiments, while such a hemispherical dome 52 is included as a precondition, an improved GUI is provided.

GUI of Embodiments

Figure 2:
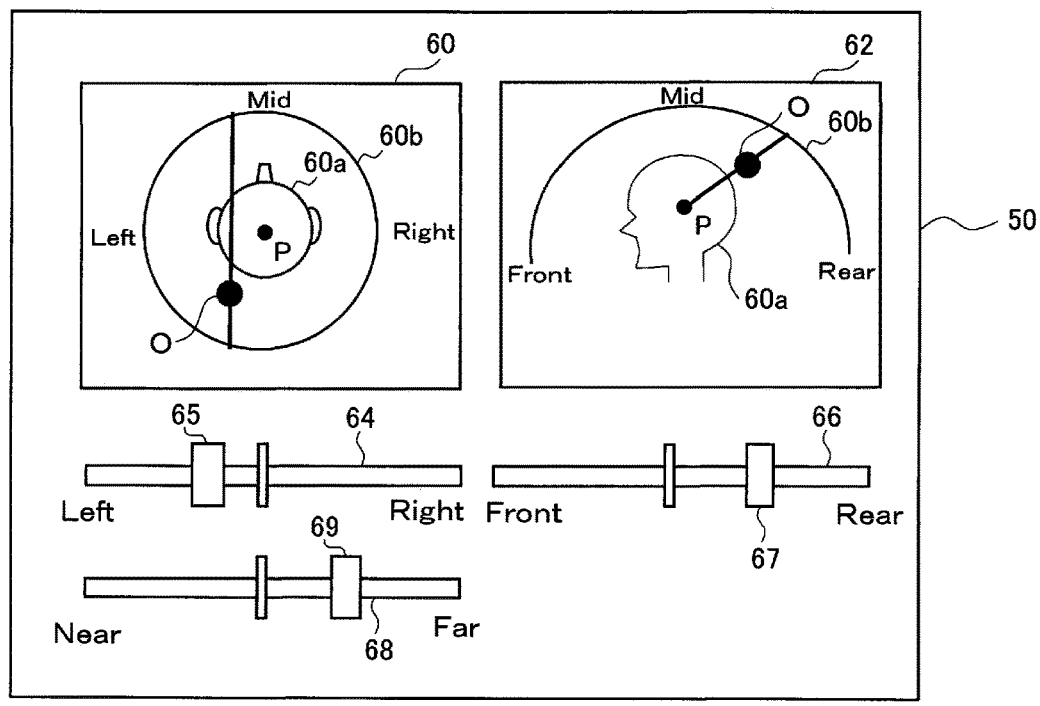
FIG. 2 illustrates a GUI screen according to an embodiment.

FIG. 2 illustrates a GUI screen displayed on the display 50 of the target position setting apparatus according to an embodiment. The GUI screen includes a top view 60 of the hemispherical dome 52 with the listener at the center as viewed from the top; that is, a projection of the hemispherical dome 52 as projected on a horizontal plane in which the listener is located; a side view 62 as viewed from the left of the listener; that is, a projection 62 of the hemispherical dome 52 as projected on a vertical plane; and slide bars 64, 66, and 68.

The top view 60 further includes an icon or a representation 60a that schematically represents the listener, an icon or a representation 60b that schematically represents the hemispherical dome 52, and a dot O that represents the target position of a sound image. The representation 60a that represents the listener is illustrated in this view in a state in which the listener faces upward. The representation 60a serves as the first representation, and the representation 60b serves as the second representation.

The side view 62 further includes a representation 60a that represents the listener, a representation 60b that represents the surface of the hemispherical dome 52, and a dot O that represents the sound image target position. The representation 60a that represents the listener is illustrated in this view in a state in which the listener faces to the left. The representation 60b in the side view 62 serves as the third representation.

The slide bar 64 is a slide bar for localizing a position in the left-to-right direction with respect to the listener, and a sound image is moved in the left-to-right direction with respect to the listener by moving a slider 65 using, for example, a mouse. The slide bar 64 corresponds to a slide bar for changing an azimuth angle θ in a horizontal plane with the midpoint P of the representation 60a at the center.

The slide bar 66 is a slide bar for localizing a position in the front-to-rear direction with respect to the listener, and a sound image is moved in the front-to-rear direction with respect to the listener by moving a slider 67 using, for example, a mouse. The slide bar 66 corresponds to a slide bar for changing an elevation angle φ with the midpoint P of the representation 60a at the center.

The slide bar 68 is a slide bar for adjusting the radius R of the hemispherical dome 52 with respect to the listener (the midpoint P of the representation 60a), and the distance R between the listener (midpoint P) and a sound image is increased or reduced by moving a slider 69 using, for example, a mouse. The slide bar 68 corresponds to a slide bar for changing the distance R from the listener to the sound image. The slide bar 68 serves as the first operation element, and the slide bars 64 and 66 serve as the second operation element.

By viewing the top view 60 and the side view 62, the user can set the distance from the sound image and the position of the sound image in the left-to-right direction and in the front-to-rear direction. More specifically, moving the slider 65 moves the dot O in the top view 60 in the left-to-right direction, and moving the slider 67 moves the dot O in the top view 60 and the dot O in the side view 62 in the front-to-rear direction. Moving the slider 69 changes the radius position with respect to the midpoint P of the dot O in the side view 62. Therefore, the user can easily identify from the top view 60 and the side view 62 the distance between the listener and the sound image and the position in the left-to-right direction and in the front-to-rear direction.

Alternatively, rather than changing the position of the dot O in the side view 62 when the user moves the slider 69, the radius of the representation 60b may be changed so that it is scaled up or down. By viewing the representation 60b, the user can visually recognize the distance between the listener and the sound image. The X position and the Y position can be identified from the top view 60, and the Z position can be identified from the side view 62.

Figure 3:
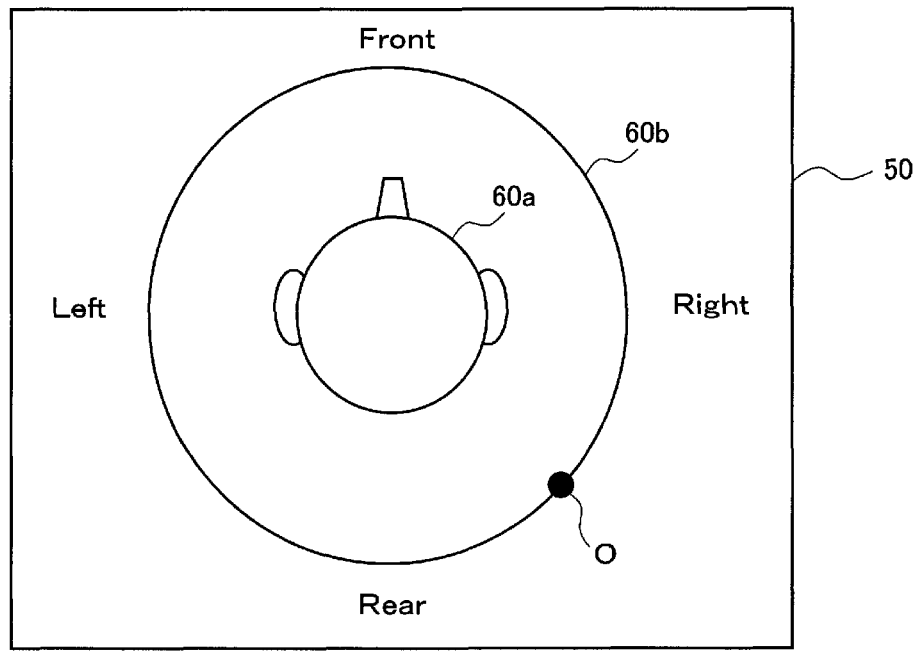
FIG. 3 illustrates a GUI screen (No. 1) according to a second embodiment.
Figure 4:
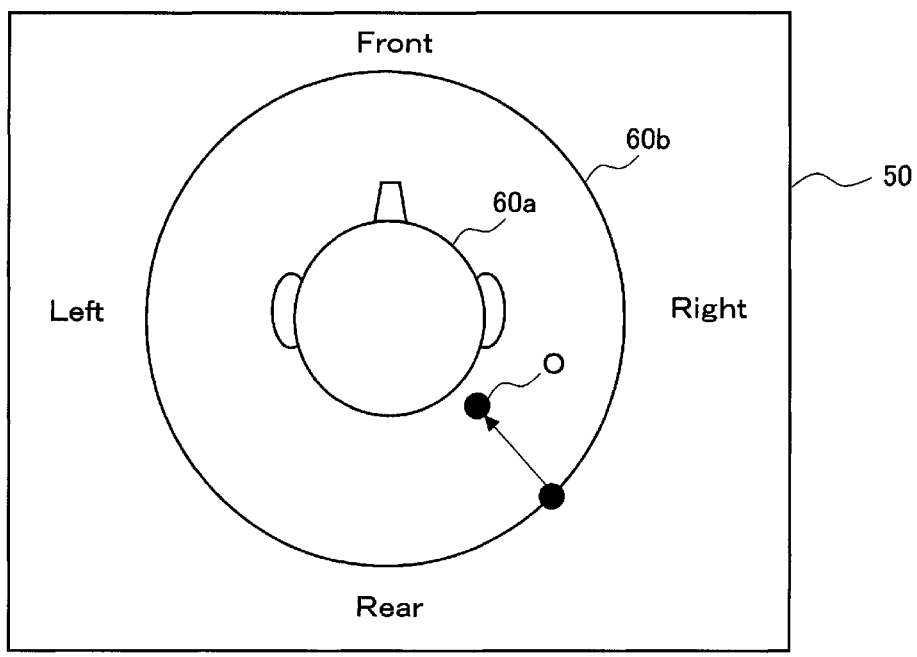
FIG. 4 illustrates a GUI screen (No. 2) according to the second embodiment.

FIGS. 3 and 4 illustrate GUI screens according to a second embodiment. The GUI screens in FIGS. 3 and 4 display only the top view 60 of the GUI screen in FIG. 2; the side view 62 is deleted and the slide bars 64, 66, and 68 are also deleted from the screens.

First, the user clicks a desired position with respect to the representation 60a of the listener as illustrated in FIG. 3, using a mouse. In response to the click operation, the radius of the representation 60b is set and displayed. A dot O is displayed at the click operation position.

Then, the user drags the mouse to a desired position to move the dot O toward the center of the representation 60a as illustrated in FIG. 4. In response to the drag operation, the position in the left-to-right direction, the position in the front-to-rear direction, and the height are set and displayed. In other words, in response to the drag operation, the dot O moves on the surface of the hemispherical dome 52; the closer to the center of the representation 60a, the closer to the top position of the hemispherical dome 52 and the higher. By viewing the dot O in FIG. 4, the user can identify not only the X position and the Y position of the sound image, but also the Z position of the sound image. In this case, the mouse serves as the first operation element and the second operation element.

Figure 5:
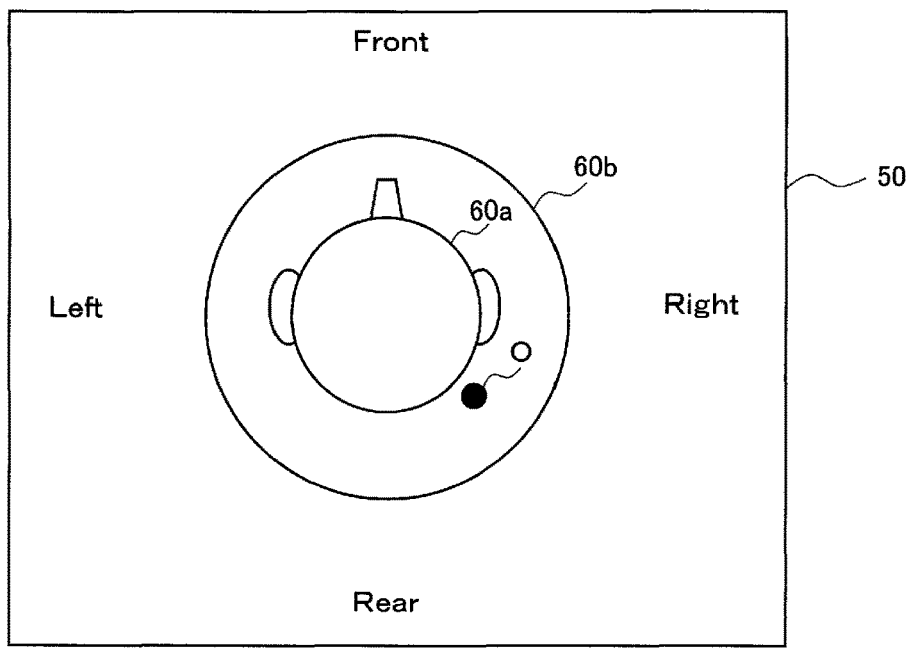
FIG. 5 illustrates a GUI screen (No. 3) according to the second embodiment.

FIG. 5 illustrates an example in which the first click position is closer to the representation 60a than that in FIG. 3. The radius of the representation 60b is less than that of the representation 60b in FIGS. 3 and 4. Therefore, the sound image is localized closer to the listener.

Figure 6:
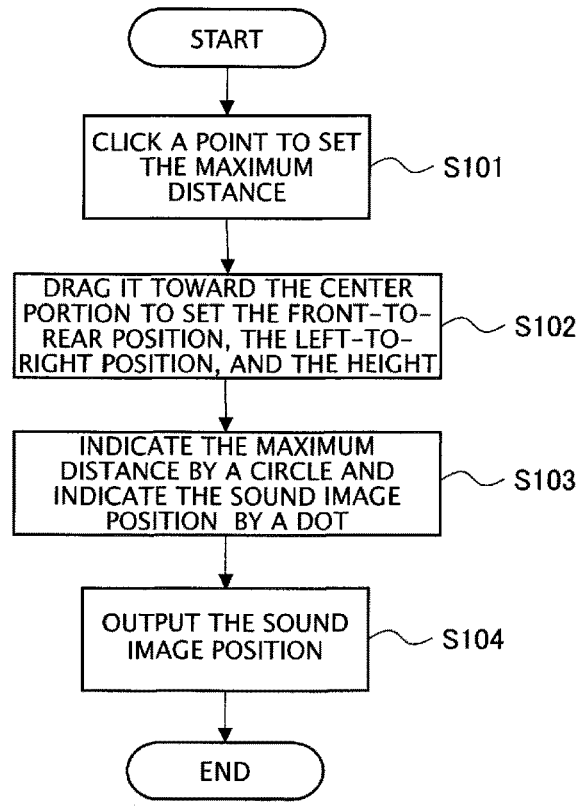
FIG. 6 is a processing flowchart according to the second embodiment.

FIG. 6 is a processing flowchart according to the illustrated embodiment. The given example is a case in which a computer serving as the target position setting apparatus causes the display 50 to display a GUI screen.

First, the user clicks a desired point (position) on the GUI screen in FIG. 3 using a mouse to set the maximum distance; in other words, the radius R of the hemispherical dome 52 (S101). In response to the setting of the radius R, a dot O is displayed at the mouse click position. A CPU of the computer detects the mouse click position and receives an input. As the mouse click operation serves as the radius R (maximum distance) setting operation, to change only the position of the dot O (sound image position) on the surface of the hemispherical dome 52 after the radius R has been set, a drag operation may be performed with a certain key, such as a shift key or a control key, being held down.

Then, the user moves the dot O through a drag operation toward the center portion to set the front-to-rear position, the left-to-right position, and the height (S102). The CPU of the computer receives a mouse drag operation input and detects a drag end position. A circle having the distance R from the center portion to the first click position as the radius is set and displayed as the representation 60b, and the drag end position is displayed in the form of a dot representing the sound image position (S103). The CPU of the computer sets the hemispherical dome 52 having the distance from the center portion to the first click position as the radius R, and localizes the drag end position on the surface of the dome 52 to output it as the sound image position (S104). The sound image position may include an azimuth angle θ and an elevation angle φ, or the X position, the Y position, and the Z position, or may be in any other form.

Figure 7:
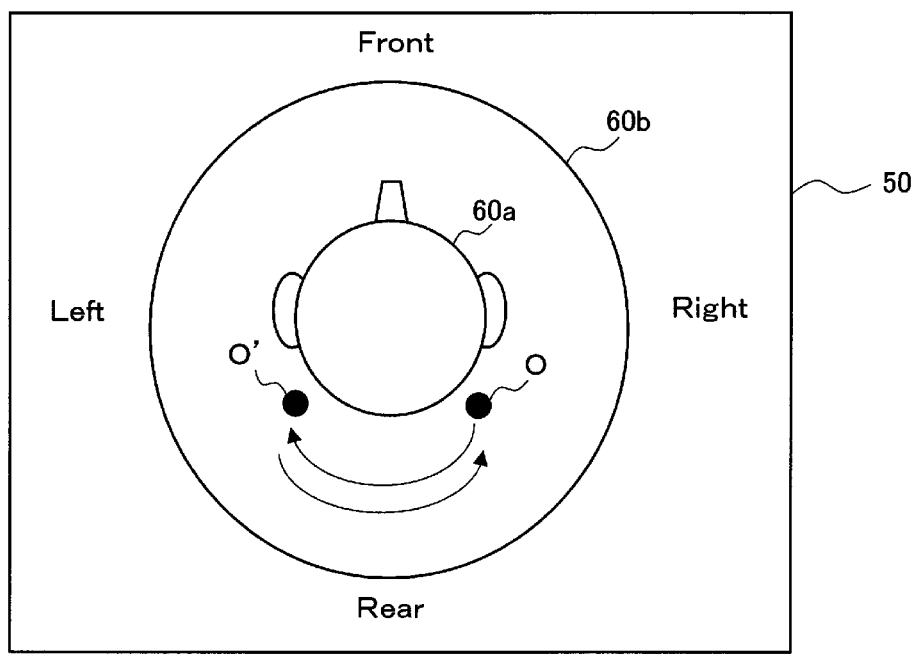
FIG. 7 illustrates a sound image path according to a third embodiment.

As described above, the target position of a sound image can be set by only a single series of click and drag operations, and the user can easily identify the X position, the Y position, and the Z position of the sound image by viewing a top view (a projection of the hemispherical dome 52 as projected on a horizontal plane) as illustrated in FIG. 4 or FIG. 5. Therefore, methods according to the illustrated embodiment can also facilitate setting of a path of a sound image while recognizing the X position, the Y position, and the Z position. FIG. 7 illustrates an example of a sound image path. A dot O that represents the position of a sound image follows a path in which it is initially located near the right ear of the listener from where it moves around the back of the listener at the same height to reach near the left ear (dot O') and then, again moves around the back of the listener in the reverse direction to return to near the right ear. By displaying such a path on a GUI screen, the user can easily identify the manner in which the sound image moves with respect to the listener. Such movement may be defined by, for example, clicking and dragging the mouse and after that, again dragging the mouse along a desired path, and the CPU of the computer detects such a drag operation and stores it as a path data file in a memory. Examples of the path data file may include a path data file that is preset as a default or a path data file that is externally supplied. In response to a user operation, the CPU reads a path data file from the memory as appropriate, and displays it in the form of the movement of the dot O on the GUI screen.

Figure 8:
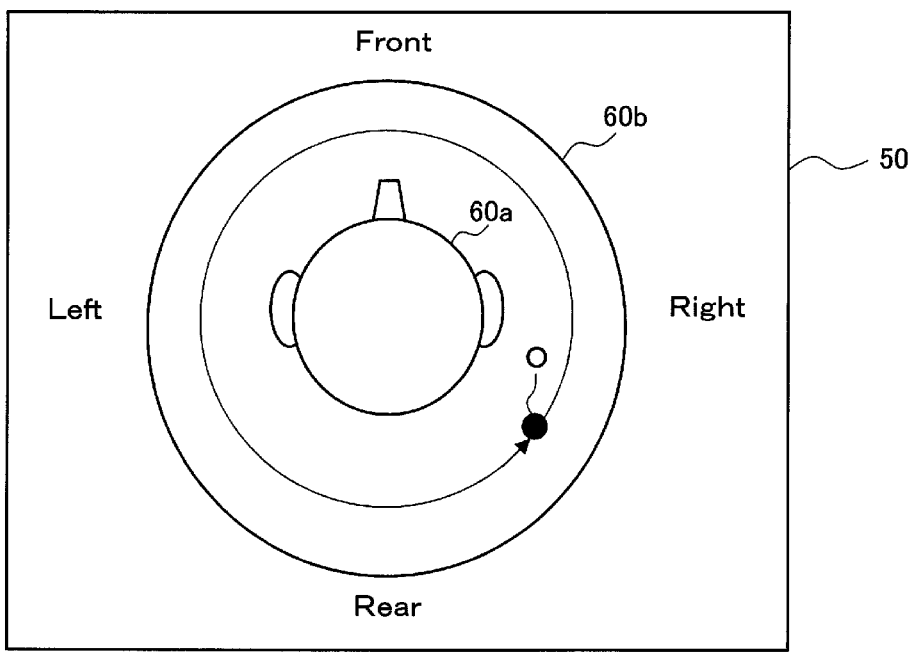
FIG. 8 illustrates a sound image path according to the third embodiment.

FIG. 8 illustrates another example of a sound image path. A dot O that represents the position of a sound image follows a path in which it is initially located near the right ear of the listener from where it moves around the listener at the same height making one complete turn in the counterclockwise direction to return to the initial position. Such movement may also be set by, for example, providing files that define the movement of a sound image as menu items beforehand and allowing the user to select a desired file. Examples of the menu items may include "A turn at the same height," "From the right ear to the left ear passing above the top of the head," and "From the front to the back."

Figure 9:
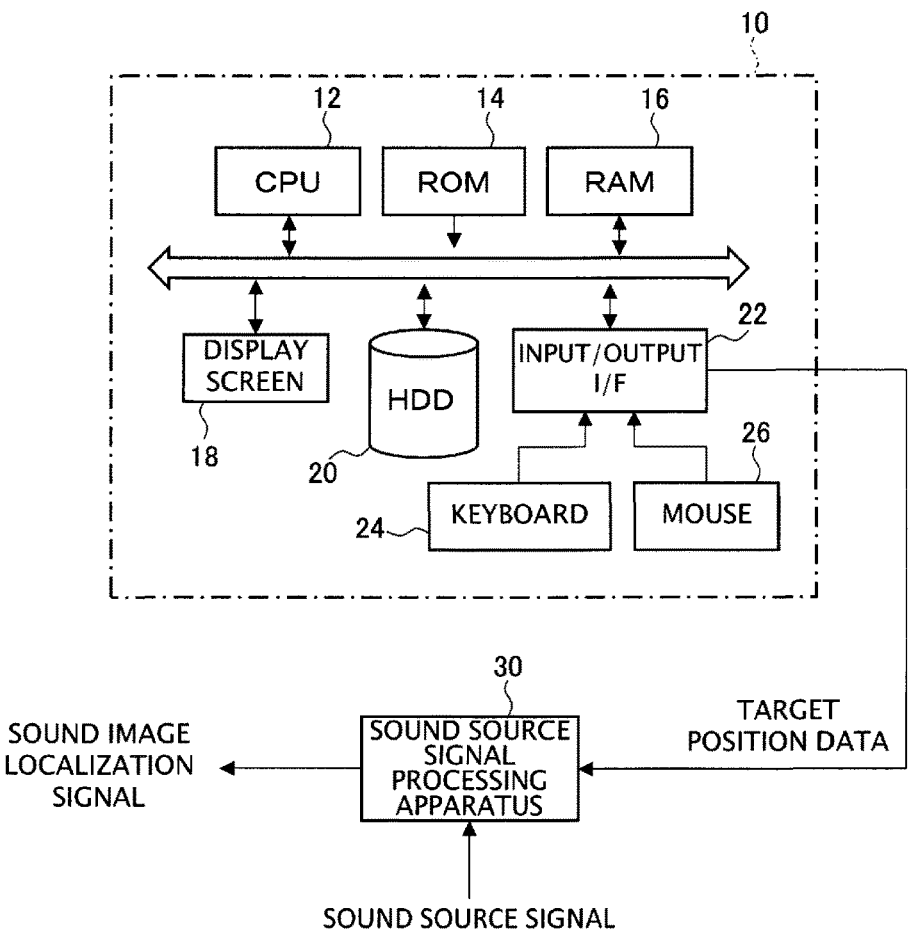
FIG. 9 is a block diagram illustrating an entire structure.

FIG. 9 is a block diagram illustrating an entire structure of a sound image localization apparatus including a target position setting apparatus. The sound image localization apparatus includes a computer 10 serving as the target position setting apparatus, and a sound source signal processing apparatus 30.

The computer 10 includes a CPU 12, a ROM 14, a RAM 16, a display screen 18, an HDD 20, an input/output interface (I/F) 22, a keyboard 24, and a mouse 26.

The CPU 12 causes the display screen 18, which serves as the display 50, to display a GUI screen in accordance with a processing program stored in the ROM 14 or the HDD 20 using the RAM 16 as working memory. The CPU 12 causes the representation 60a of the listener to be displayed substantially at the center of the GUI screen. In response to the user's click operation of the mouse 26, a corresponding operation signal is supplied to the CPU 12 through the input/output I/F 22. The CPU 12 detects the click position, sets the radius R of the hemispherical dome 52, and stores it in, for example, the RAM 16. Further, in response to the user's drag operation of the mouse 26, a corresponding operation signal is supplied to the CPU 12 through the input/output I/F 22. The CPU 12 detects the drag end position, sets the X position, the Y position, and the Z position of a sound image, and stores them in, for example, the RAM 16. The CPU 12 reads the radius R stored in, for example, the RAM 16, and causes the display screen 18 to display the representation 60b of the hemispherical dome 52 and to display a dot O that represents the position of the sound image at the drag end position. The X position, the Y position, and the Z position stored in the RAM 16 are output to the sound source signal processing apparatus 30 as the target position data of the sound image.

Figure 10:
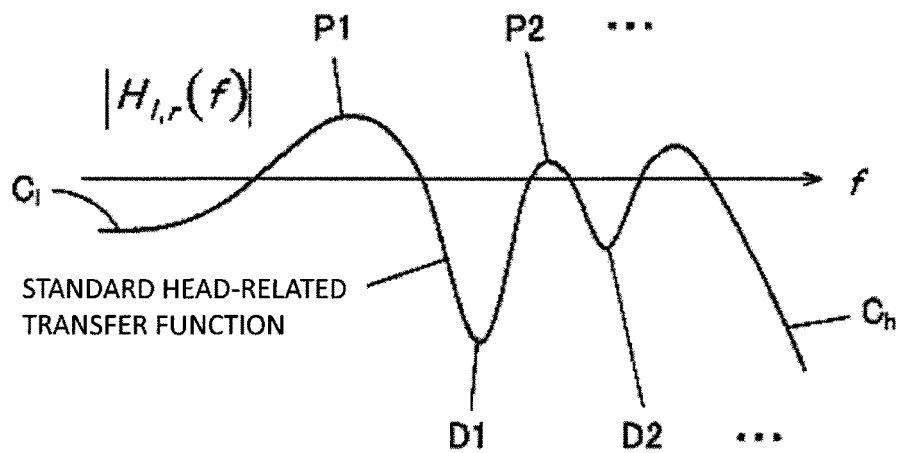
FIG. 10 illustrates a head-related transfer function.

The sound source signal processing apparatus 30 processes a sound source signal using, for example, a head-related transfer function HRTF, and outputs a sound image localization signal to, for example, a loudspeaker or headphones. The processing of a sound source signal using a head-related transfer function HRTF is known and disclosed in, for example, JP 2008-211834 A. FIG. 10 illustrates an example of a head-related transfer function disclosed therein. By reproducing structural characteristics such as peaks P1, P2, . . . , dips D1, D2, . . . , high frequency attenuation Ch, and low frequency attenuation Cl included in amplitude frequency characteristics |HI,r(f)| of a standard head-related transfer function HRTF corresponding to the target position of a sound image, the sound image can be controlled to the target position.

Specifically, in response to an input of the target position data from the computer 10, the sound source signal processing apparatus 30 sets parameters corresponding to structural characteristics for the right ear and for the left ear separately in accordance with the input target position data, and sets those parameters for an IIR filter for the right ear and for an IIR filter for the left ear to process a sound source signal through these IIR filters to output sound image localization signals for Rch and Lch.

Although embodiments of the present disclosure are described above, the present disclosure is not limited to these embodiments and various modifications are possible. Modification examples will be described below.

Modification Example 1

Although, in the embodiments, the target position of a sound image is set using a mouse, the display 50 may be implemented by a touch screen and the target position may be set by a touch operation. Specifically, referring to FIG. 3, the user may touch a desired position, and may then move the finger toward the center. In this case, the touch screen serves as the first operation element and the second operation element. As the touch operation on the touch screen serves as the radius R (maximum distance) setting operation, removing the finger from the touch screen after the radius R has been set, and again touching the touch screen will reset the radius R. Therefore, in order to enable changing of only the position of the dot O (sound image position) without resetting the radius R, for example, a detection of a double touch on the touch screen may be recognized as the radius R setting operation to set the radius R, and a detection of a single touch on the touch screen may be recognized as the dot O drag operation instruction so that the dot O can be dragged without changing the radius R.

Modification Example 2

In the embodiments, the sound image localization apparatus includes the computer 10 and the sound source signal processing apparatus 30 as illustrated in FIG. 9. These components may be incorporated in the same housing, or may be disposed in separate housings such that they can transmit and receive data through a wired or wireless connection. For example, the computer 10 may be implemented by a tablet or a smartphone. For example, the user may set the target position of a sound image through a touch operation on a tablet or a smartphone, and the target position data may be wirelessly output to the sound source signal processing apparatus 30.

Modification Example 3

Although, in the embodiments, sound image paths as illustrated in FIGS. 7 and 8 are presented, other presentations are possible. For example, the target position of a sound image may be moved randomly with respect to the listener.

Modification Example 4

Although, in the embodiments, the dot O representing the target position of a sound image on a GUI screen is a black round dot, the shape and the color may be freely chosen. Any mark that can be visually recognized by the user may be displayed. The mark may be movable by an operation element such as a slide bar or a mouse, or may be movable through a touch operation.

Modification Example 5

In the embodiments, a circle with the listener at the center is provided as the representation 60b of the hemispherical dome 52 with the listener at the center as projected on a horizontal plane. Gradation may be added to an area within this circle to visually indicate the height. Any presentation method for two-dimensionally rendering the three-dimensional height may be used.

Modification Example 6

Figure 11:
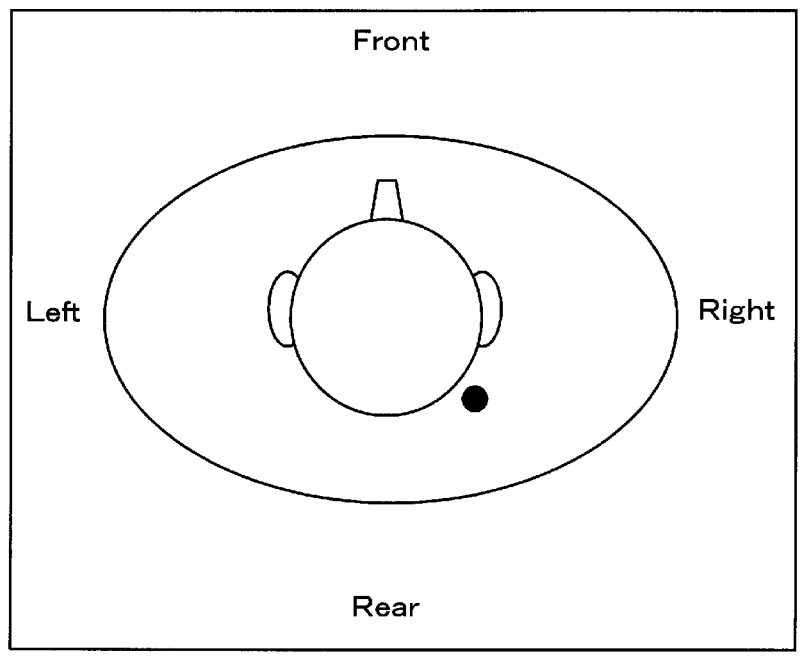
FIG. 11 illustrates a GUI screen according to a modification example.

Although, in the embodiments, a circle with the listener at the center is provided as the representation 60b of the hemispherical dome 52 with the listener at the center as projected on a horizontal plane, the circle may be replaced with an ellipse as illustrated in FIG. 11. The auditory sense of a human tends to react sensitively to the left-to-right movement of a sound but react relatively insensitively to the front-to-rear movement of a sound. Therefore, using an ellipse having a longer radius in the left-to-right direction and a shorter radius in the front-to-rear direction as the representation 60b is believed to balance the auditory sense. Here, "hemispherical" encompasses "hemiellipsoid." In other words, the radius R does not have to be exactly constant.

The invention claimed is:

1. A target position setting apparatus comprising:
a display device configured to display an image that includes a first representation that represents a listener, a second representation that is obtained by projecting a hemispherical dome having a radius R with the listener at the center on a horizontal plane, and a mark that represents a target position of a sound image in association with the second representation, wherein the second representation is a top view of the hemispherical dome with the listener at the center as viewed from a top of the hemispherical dome, and the display device displays the mark that represents the target position of the sound image moving along a sound image path in association with the second representation;
a first operation element configured to set the radius R;
a second operation element configured to move the mark within the second representation included in the image displayed by the display device; and
a controller configured to output three-dimensional position data of the mark with respect to the listener as target position data for sound image localization.

2. The target position setting apparatus according to claim 1, wherein the display device is further configured to display an image that includes a third representation that is obtained by projecting the hemispherical dome having the radius R on a vertical plane and to display the mark in association with the third representation.

3. The target position setting apparatus according to claim 1, wherein the second representation has a size that represents a distance from a sound image with respect to the listener, the mark is located at a position that represents a position of the sound image with respect to the listener in a left-to-right direction, in a front-to-rear direction, and in a height direction, and the display device displays in the second representation a visual indication of a height in the height direction of the sound image.

4. The target position setting apparatus according to claim 1, wherein the first operation element and the second operation element comprise a mouse, wherein the radius R is set in response to a click operation of the mouse, and the mark is moved in response to a drag operation of the mouse.

5. The target position setting apparatus according to claim 1, wherein the first operation element and the second operation element comprise a touch screen, wherein the radius R is set in response to a touch operation on the touch screen, and the mark is moved in response to movement of a finger on the touch screen.

6. The target position setting apparatus according to claim 1, wherein each of the first operation element and the second operation element comprises a slide bar displayed by the display device.

7. The target position setting apparatus according to claim 1, wherein the display device displays the mark that represents the target position of the sound image moving along the sound image path from a first location to a second location, and from the second location back to the first location.

8. The target position setting apparatus according to claim 1, wherein the display device displays the mark that represents the target position of the sound image moving along the sound image path that is behind the listener.

9. The target position setting apparatus according to claim 1, wherein the display device displays the mark that represents the target position of the sound image along the sound image path at a same height.

10. The target position setting apparatus according to claim 1, wherein the sound image path encircles the first representation that represents the listener.

11. The target position setting apparatus according to claim 1, wherein the mark is located at a position that represents a position of the sound image with respect to the listener in a left-to-right direction, in a front-to-rear direction, and in a height direction, and the display device displays the mark that represents the target position of the sound image moving along the sound image at a same height in the height direction.

12. The target position setting apparatus according to claim 1, wherein the controller is configured to set the sound image path based on a user operation.

13. The target position setting apparatus according to claim 12, wherein the user operation is a drag operation.

14. The target position setting apparatus according to claim 12, wherein the user operation is a selection of one of a plurality of sound image paths.

15. The target position setting apparatus according to claim 14, wherein the sound image paths include a first sound image path with a turn at a same height, a second sound image path from a right ear of the listener to a left ear of the listener passing above a top of a head of the listener, and a third sound image path from a front of the listener to a back of the listener.

16. A sound image localization apparatus comprising:
a target position setting apparatus that includes:
a display device configured to display an image that includes a first representation that represents a listener, a second representation that is obtained by projecting a hemispherical dome having a radius R with the listener at the center on a horizontal plane, and a mark that represents a target position of a sound image in association with the second representation, wherein the second representation is a top view of the hemispherical dome with the listener at the center as viewed from a top of the hemispherical dome, and the display device displays the mark that represents the target position of the sound image moving along a sound image path in association with the second representation;
a first operation element configured to set the radius R;
a second operation element configured to move the mark within the second representation included in the image displayed by the display device;
a controller configured to output three-dimensional position data of the mark with respect to the listener as target position data for sound image localization; and
a sound source signal processing apparatus configured to process a sound source signal using the target position data output from the target position setting apparatus to output a sound image localization signal.

* * * * *